(12) United States Patent
De Latour

(10) Patent No.: US 9,063,224 B2
(45) Date of Patent: Jun. 23, 2015

(54) METHOD FOR THE ACQUISITION OF RADIONAVIGATION SIGNALS CARRYING SPREADING CODE WITH A QUASI-INFINITE PERIOD

(75) Inventor: Antoine Richard De Latour, Toulouse (FR)

(73) Assignee: CENTRE NATIONAL D'ETUDES SPATIALES (FR)

( * ) Notice: Subject to any disclaimer, the term of this patent is extended or adjusted under 35 U.S.C. 154(b) by 964 days.

(21) Appl. No.: 12/942,511

(22) Filed: Nov. 9, 2010

(65) Prior Publication Data

US 2011/0129002 A1 Jun. 2, 2011

(30) Foreign Application Priority Data

Nov. 10, 2009 (FR) .................................. 09 57945

(51) Int. Cl.
*H04B 1/00* (2006.01)
*G01S 19/30* (2010.01)
*H04B 1/708* (2011.01)

(52) U.S. Cl.
CPC ................ *G01S 19/30* (2013.01); *H04B 1/708* (2013.01)

(58) Field of Classification Search
USPC ............................................. 375/150, E1.003
See application file for complete search history.

(56) References Cited

U.S. PATENT DOCUMENTS

| | | | |
|---|---|---|---|
| 6,407,699 B1 * | 6/2002 | Yang | 342/357.59 |
| 8,401,111 B2 * | 3/2013 | Sampath et al. | 375/295 |
| 2004/0071200 A1 * | 4/2004 | Betz et al. | 375/152 |
| 2006/0097915 A1 * | 5/2006 | Martin et al. | 342/357.15 |
| 2008/0159198 A1 | 7/2008 | Chen | |
| 2009/0052505 A1 * | 2/2009 | Raffegeau | 375/150 |

OTHER PUBLICATIONS

GNSS Solutions, "Signal acquisition and search, and antenna polarization: How does signal acquisition with batch processing (i.e., FFTs) work? How is it different than traditional serial search techniques", InsideGNSS, Mar./Apr. 2007, pp. 1-8.

Heiries, "Analysis of Non Ambiguous BOC Signal Acquisition Performance", ION GNSS 17th International Technical Meeting of the Satellite Division, Sep. 21-24, 2004, Long Beach CA, pp. 1-12. XP-002471945.

* cited by examiner

*Primary Examiner* — Shuwang Liu
*Assistant Examiner* — Nader Bolourchi
(74) *Attorney, Agent, or Firm* — Cantor Colburn LLP

(57) ABSTRACT

A method for the acquisition of a radionavigation signal carrying a spreading code with a quasi-infinite period, where the signal is sampled in baseband on a delay line and correlated with a local spreading code replica, the sampled signal is shifted on the delay line from one correlation to the other, where in order to correlate the signal with the local replica of the code, a plurality of sequences of the spreading code are generated, the code sequences being of the same duration, equal to the duration of the signal sampled on the delay line, and associated with the consecutive time ranges in the temporal alignment search space, where each of the code sequences is correlated with the signal sampled in a respective correlation operation, the correlation operations being executed in parallel for the different sequences of code.

12 Claims, 7 Drawing Sheets

METHOD FOR THE ACQUISITION OF RADIONAVIGATION SIGNALS CARRYING SPREADING CODE WITH A QUASI-INFINITE PERIOD

TECHNICAL FIELD

The present invention relates to an acquisition method, preferably assisted in external time, of radionavigation signals carrying spreading codes with a quasi-infinite period. The invention moreover relates to a means for implementing such a process.

BACKGROUND

Generally speaking, radionavigation signals transmitted by satellites (or pseudolites) of a positioning system are in the form of a carrier modulated by a type of spreading waveform containing a pseudo-random binary code ("spreading code"). As the modulation of the carrier causes the spreading of the spectrum around the carrier frequency, the radionavigation signals are often called "in spread-spectrum". The pseudo-random codes represent a signal identifier and therefore an identifier of the transmitting satellite. When known to the receivers, they enable the receivers with a code division multiple access (CDMA). Secondarily, certain satellite positioning signals can also transport useful data (e.g. the navigation message) in the form of a binary sequence (at a markedly lower rate than the pseudo-random code) also modulated on the carrier. In the following we will neglect this useful data load.

In the case of Global Positioning System (GPS), the radionavigation signals are transmitted in the frequency bands L1, centred on 1575.42 MHz and L2, centred on 1227.6 MHz. The band L5, centred on 1176.45 MHz, will be added when the GPS is updated. The satellites of the Galileo constellation will transmit in the bands E2-L1-E1 (the portion of the middle band L1 being the same as that of GPS), E5a (which, pursuant to the Galileo nomenclature, represents the band L5 destined for GPS), E5b (centred on 1207.14 MHz) and E6 (centred on 1278.75 MHz). The satellites of the Compass constellation transmit or will transmit in the band B1 (centred on 1561.098 MHz), B1-2 (centred on 1589.742 MHz), L1 (centred on 1575.42 MHz), B2 (centred on 1207.14 MHz) and B3 (centred on 1268.52 MHz). The central frequencies represent the frequencies of the carriers of the different signals.

The reception of a radionavigation signal normally comprises a first demodulation with the help of an internal replica of the carrier generated in the receiver by an oscillator commanded by a carrier tracking loop and a second demodulation with the help of an internal replica of the spreading waveform (the "replica code") produced by a waveform generator commanded by a spreading waveform tracking loop (also called "code tracking loop"). The feedback signals from the carrier tracking and spreading waveform loops are used by the receiver to determine its position. The continuation principally concerns the observable of code, i.e. the time lag signal between the spreading waveform of the received signal and the internal replica of the spreading waveform produced at each epoch by the tracking loop of the spreading waveform. It should be noted however that a carrier tracking loop is used to compensate for the Doppler effect.

The code and carrier internal replicas are mixed (multiplied) with the entering radionavigation signal, after this has been filtered, amplified transposed in frequency as well as digitised. The mixed products are then integrated, thereby realising, broadly speaking, an operation of correlation between the internal replicas and the entering signal. In radionavigation signal reception one usually distinguishes between two phases: the "acquisition" phase and the "tracking" phase. In the acquisition phase one attempts to synchronise the internal replica of the code on the entering radionavigation signal (in other words, one attempts to measure the code delay) as well as the Doppler frequency of the entering radionavigation signal. Therefore, in principle, the search area is a two-dimensional space, in which one seeks the values of the code delay and the Doppler frequency shift, which maximise the correlation function. (In practice, the signal is considered to have been acquired if the correlation exceeds a specific threshold value.)

Certain radionavigation signals use modulations having recourse to a form of spreading wave, in which the pseudo-random binary code is multiplied by a binary sequence having a higher rate than the code. Hereinafter, such modulations will be called "sub-carrier modulations". The binary sequence with a higher rate will be considered as the sub-carrier, which is justified by the fact that the density of the spectral energy of such a signal has two principal lobes that are at a distance from the carrier frequency by a spectral deviation equivalent to the central frequency (sub-carrier frequency) of the binary sequence. Some examples of these modulations are the binary coded symbol (BCS) modulations and the binary offset carrier (BOC) modulations, which in fact represent specific BCS modulations. Generally speaking, BOC(n,m) is a function of time t defined by:

$$BOC(n,m)(t) = C_m(t) \cdot \text{sign}[\sin(2\pi f_{sc} t)], \quad (\text{Eq. 1})$$

where $C_m(t)$ is a pseudo-random binary code with a chip rate m×1.023 Mcps (mega chips per second, i.e. $10^6$ chips per second) taking the values +1 or −1 and $f_{sc}$ is the sub-carrier frequency n×1.023 MHz. A condition for n and m is that the ratio 2n/m is a whole number. In the case of the OS (open service) of Galileo, the chip rate is fixed at 1.023 Mcps (mega-chips per second). The "sub-carrier BOC" is understood to mean the BOC waveform without the code, i.e. the part sign[sin($2\pi f_{sc} t$)]. Remark: if the sinus in the right hand side of the equation 1 is replaced by a cosinus, then the quadrature of the function BOC, called BOCc, is obtained:

$$BOCc(n,m)(t) = C_m(t) \cdot \text{sign}[\cos(2\pi f_{sc} t)]. \quad (\text{Eq. 2})$$

The "sub-carrier BOCc" is understood to mean the BOC waveform without the code, i.e. the part sign[cos($2\pi f_{sc} t$)].

More generally, the waveform in quadrature phase of a spreading waveform BCS is obtained by cyclically shifting the sequences of symbols by a half symbol.

The sub-carrier modulations referred to above have certain advantages over the classical binary phase shift keying (BPSK) modulations, notably in the precision of the measurement of position obtained based on the code observables. However, the sub-carrier spreading waveforms also have some drawbacks, because their acquisition and tracking are more difficult to realise than e.g. the acquisition and tracking of a signal of the BPSK type. This can be explained with the help of auto-correlation functions. The auto-correlation function of a BPSK modulation has only a single extremum (for a time lag of 0); that of a sub-carrier modulation exhibits oscillations and therefore a plurality of extrumums, onto which the tracking code loop can lock itself. In other words, a tracking code loop discriminator that exhibits a higher precision given by the sub-carrier will have the disadvantage of being ambiguous (in the sense that the delay between the spreading waveform of the received signal and its internal replica is potentially evaluated with respect to an incorrect peak of the correlation function).

The spreading codes normally exhibit a fixed periodicity of the order of several milliseconds, such as e.g. 1 ms (1023 chips) for the Gold codes used in the C/A signal of the GPS system or 4 ms (4092 chips) for the (primary) codes used in the case of the open service (OS) signal of Galileo. The methods for radionavigation signal acquisition modulated by such codes can therefore exploit the periodicity of the code. Document WO 2006/040325 A1, for example discloses an acquisition method utilising a "matched filter", in which the spreading code in its entirety is sampled and loaded into a code register and the radionavigation signal is sampled in a signal register. At each clock cycle the signal correlation is calculated in the register and the code, and the sample signal is shifted in its register between two correlation operations. The code is not shifted.

Document WO 2004/034604 A1 discloses another acquisition method. In this method the spreading code is loaded by sampled segments into a code register and the radionavigation signal is sampled into a signal register. At each clock impulse the correlations between the code segments and the corresponding parts of the signal are calculated, thereby affording a plurality of short term correlations (STC). The sum of all the STCs is equal to the correlation between the entire code and the signal in the register. However, this sum is not calculated; it is rather the Fourier transform of the vector of the STC values. This Fourier transform enables the Doppler frequency to be detected. Between two correlation operations (calculation of the different STCs and associated steps for a given shift), the signal of a sample is shifted in its register, the code remaining fixed. Other acquisition methods are explained e.g. in the article "Signal acquisition and search, and antenna polarization", published in Inside GNSS, March/April 2007, pp. 26-33.

Certain radionavigation signals carry spreading codes having a much longer periodicity (preferably at least 10 times, even 100 or 1000 times longer) than the correlation time (i.e. the time between the coherent integration limits that are part of the correlation operation). In the context of the present document, such codes will be called "with a quasi-infinite period". The traditional acquisition methods described above are only partially applicable to the acquisition of radionavigation signals having spreading codes with a quasi-infinite period. If the period of the code is of the same order of magnitude as the correlation time (several milliseconds), then it suffices to load the code into a register and to calculate its correlation with the radionavigation signal for different shifts of the signal. In fact, if the signal carries the tested code, then one is certain to obtain a correlation peak at the latest when the signal will have been shifted by one period of code. If the same strategy is used to acquire signals that carry codes having a long period, then there is a risk of having to wait a considerable time before finding a correlation peak. Consequently, another acquisition strategy needs to be used for these signals.

BRIEF SUMMARY

The invention provides an improved method for the acquisition of radionavigation signals carrying spreading codes with a quasi-infinite period.

According to the invention, a method of acquisition of a radionavigation signal carrying a spreading code with a quasi-infinite period comprises the sampling of the baseband radionavigation signal on a delay line and the correlation of the radionavigation signal on the delay line with a local spreading code replica. From one correlation to the other, the sampled signal is shifted on the delay line (while the local replica of code generally remains fixed). The results of the correlations therefore enable the time delay between the spreading code of the entering radionavigation signal and the internal spreading code replica to be identified in a temporal alignment search space. The method according to the invention is characterised in that to realise the correlation of the base band radionavigation signal with the local spreading code replica, a plurality of spreading code sequences is generated, said spreading code sequences being of the same duration, equal to the duration of the radionavigation signal sampled on the delay line, and associated with the consecutive time ranges in the temporal alignment search space. Each of the spreading code sequences is correlated with the radionavigation signal sampled in a respective correlation operation, said correlation operations being executed in parallel for the different spreading code sequences. The correlation of the base band radionavigation signal with the local spreading code replica is preferably carried out with the help of a suitable filter.

It should be noted that the different segments of code are correlated with the same sequence of samples of the radionavigation signal. As each spreading code sequence corresponds to another search range in the temporal alignment search range between the spreading code and its local replica, then in fact, a plurality of parallel temporal alignment searches is effected in a considerably enlarged global search range, thereby notably reducing the average time for acquiring the radionavigation signal.

The sampling of the baseband radionavigation signal on the delay line preferably comprises the representation of the radionavigation signal by an in-phase component and a quadrature phase component, both being sampled on a respective channel of the delay line. In this case, each of the spreading code sequences is correlated with the in-phase component and with the quadrature phase component. Preferably, the channels of the in-phase and quadrature phase components are interleaved on the delay line, such that the spreading code sequences are correlated alternately with the in-phase component and the quadrature phase component.

It can be appreciated that the method according to the invention can be adapted for the acquisition of a radionavigation signal modulated by a sub-carrier. According to one advantageous embodiment of the method, the generated code sequences are modulated by a local replica of the sub-carrier. According to another embodiment of the method, the sampling of the base band radionavigation signal on a delay line comprises the splitting of the radionavigation signal into the in-phase component of the signal multiplied by a local replica of the in-phase sub-carrier, the in-phase component of the signal multiplied by a local replica of the quadrature phase sub-carrier, the quadrature phase component of the signal multiplied by a local replica of the in-phase sub-carrier and the quadrature phase component of the signal multiplied by a local replica of the quadrature phase sub-carrier. These components are advantageously sampled on the respective channels of the delay line and each spreading code sequence is correlated with each of the components. The component channels are preferably interleaved on the delay line in a predefined order, such that each spreading code sequence is correlated alternately with the different components.

As the method according to the invention is aimed at the acquisition of signals carrying spreading codes with a quasi-infinite period, in practice it is not possible to perform the correlations with code sequences that are always the same (as in the case of short-period codes) and wait for a correlation peak to appear. Preferably, the spreading code sequences are generated on the basis of a global navigation satellite system (GNSS) indication of time provided by an external means for time, e.g. an external synchronisation signal. An external means for time can be made available, for example by a network time protocol (NTP) server via a telecommunication link (wire or wireless). Preferably, the precision of the external means for time is at least of the same order of magnitude as the capture rate of the method, i.e. the duration of the delay line multiplied by the number of code sequences correlated in parallel with the signal on the delay line.

One aspect of the invention relates to a GNSS receiver configured to acquire a radionavigation signal carrying a spreading code with a quasi-infinite period. The receiver comprises sampling means designed to sample the base band radionavigation signal on a delay line and correlation means to correlate the radionavigation signal on the delay line with a local replica of the spread code in order to identify a temporal difference between the spreading code of the radionavigation signal and the local spreading code replica in a temporal alignment search space. The correlation means are designed so as to generate a plurality of sequences of the spreading code, the spreading code sequences being of the same duration, equal to the duration of the radionavigation signal sampled on the delay line and associated with the consecutive time ranges in the temporal alignment search space, and so as to generate each of the sequences of the spreading code with the radionavigation signal sample in a respective correlation operation, wherein the correlation means execute the correlation operations in parallel for the different spreading code sequences. Moreover, the receiver can be configured to implement the different embodiments of the method such as those described above.

Another aspect of the invention relates to a computer program intended to be run in a geopositioning receiver, wherein said computer program is designed to implement the method when the program is executed in the receiver. The computer program can be integrated in a computer program product comprising a data carrier (hard disc, CD-ROM, USB key or suchlike), on which the program is loaded, or a signal, in which the program is encoded according to a specific protocol (e.g. TCP/IP, Ethernet, Bluetooth, etc.).

BRIEF DESCRIPTION OF THE DRAWINGS

Other distinguishing features and characteristics of the invention will emerge from the detailed description of several advantageous illustrative embodiments presented below, on referring to the appended drawings. They show.

DETAILED DESCRIPTION

Figure 1:
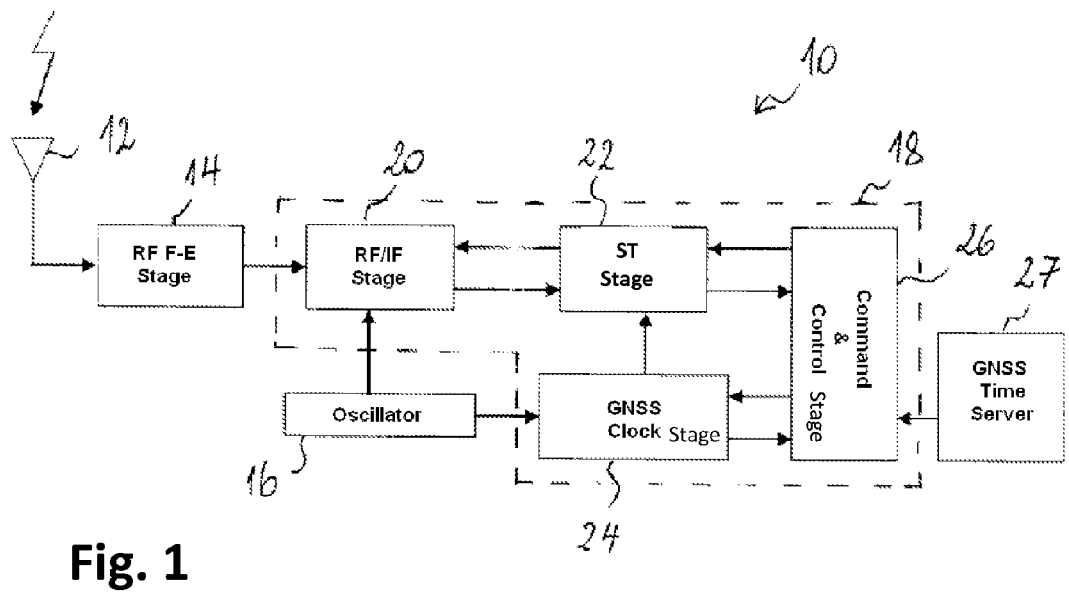
FIG. 1: is a general diagram of a GNSS receiver equipped with a module for the acquisition of radionavigation signals.

Un example of an acquisition module for radionavigation signals is shown schematically in FIG. 1 as part of a GNSS receiver. The receiver 10 comprises an antenna 12, a front end radio frequency stage 14, an oscillator 16 as well as the acquisition module 18 that regroups an RF/IF conversion stage 20, a signal treatment stage 22, a clock stage 24 and a command and control stage 26. The acquisition module receives a synchronisation signal from an external time auxiliary, depicted in FIG. 1 as timeserver GNSS 27 (which is not normally part of the GNSS receiver but is linked in communication with it).

Figure 2:
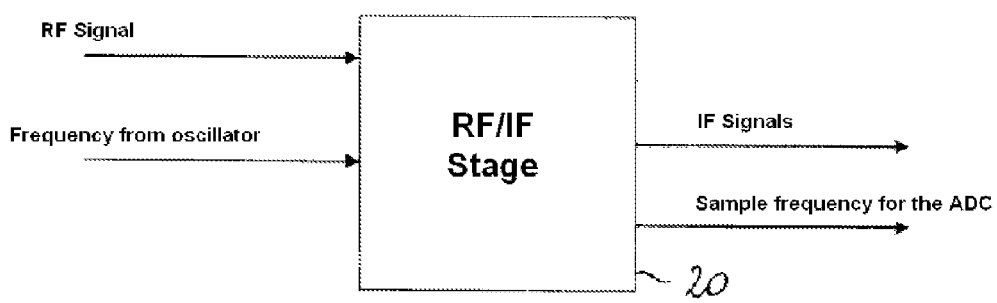
FIG. 2: is a diagram of the interfaces of the RF/IF stage.

The RF/IF stage 20 is shown in more detail in FIG. 2. It ensures the transposition of the radionavigation signals received in the radio frequency (RF) band towards an intermediate frequency (IF), the generation of the sampling frequency for the analogue to digital converters (ADC) downstream from the signal treatment stage 22, the maintenance of the signal strength about the optimal operating performance of the ADC as well as the rejection of interferences outside the frequency bands of interest.

The interfaces of the RF/IF stage 20 in input are:
an RF signal containing the radionavigation signals, and
a reference frequency originating from the oscillator.
In output, the RF/IF stage 20 produces:
a signal at the intermediate frequency containing the radionavigation signals and
a signal that serves as the sampling frequency for the ADC for the signal treatment stage 22.

Figure 3:
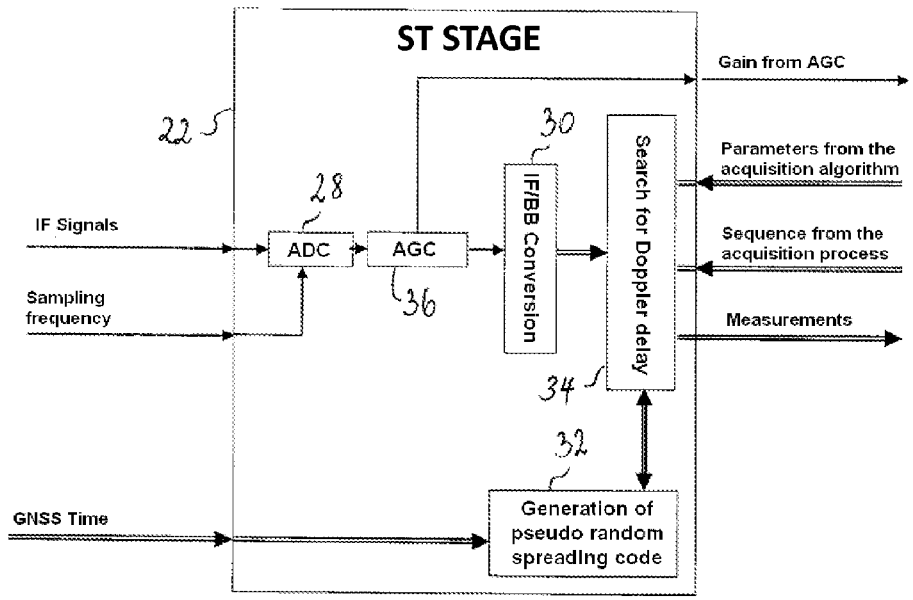
FIG. 3: is a diagram of the signal treatment stage.

A diagram of the signal treatment (ST) stage 22 is shown in FIG. 3. The signal treatment stage 22 effects the following tasks:
the digitisation, in an ADC 28, of the signal received in the intermediate frequency,
the conversion of this signal into baseband (BB) by means of a frequency converter IF/BB 30,
the generation, in a code generator 32, of the local spreading code replica used by the correlation module 34, and
the search for the time lag and for the Doppler frequency in acquisition phase by means of the correlation module 34.

The search in the delay/Doppler space is preferably carried out in single-channel mode (the alternative being to use a plurality of channels in order to independently test a plurality of Doppler hypotheses at the same time), but this is not a condition in the context of the invention. The correlation module 34 outputs the correlation value (measure of energy) obtained for each of the cases (or cells) of the delay-Doppler space. The parameters of the acquisition algorithm are the delay-Doppler search range, the detection threshold (above which, the signal is considered acquired) in terms of signal to noise ratio as well as the characteristics of the radionavigation signal, such as for example the type of modulation (BPSK, BOC or other), the number of the pseudo-random code (or the satellite number), the manner in which the pseudo-random code has to be generated (by a code sequence in memory, using a polynomial, and/or using a cryptographic algorithm in the case of encrypted signals).

The GNSS clock stage 24 (shown schematically in FIG. 4) receives an input synchronisation signal on the GNSS time provided by the command and control stage 26 as well as the frequency reference signal. Starting from these inputs the GNSS clock stage 24 produces an accurate GNSS clock signal, distributed notably to the signal treatment stage 22 that bases itself on this signal in order to produce the internal code sequence replicas.

Figure 5:
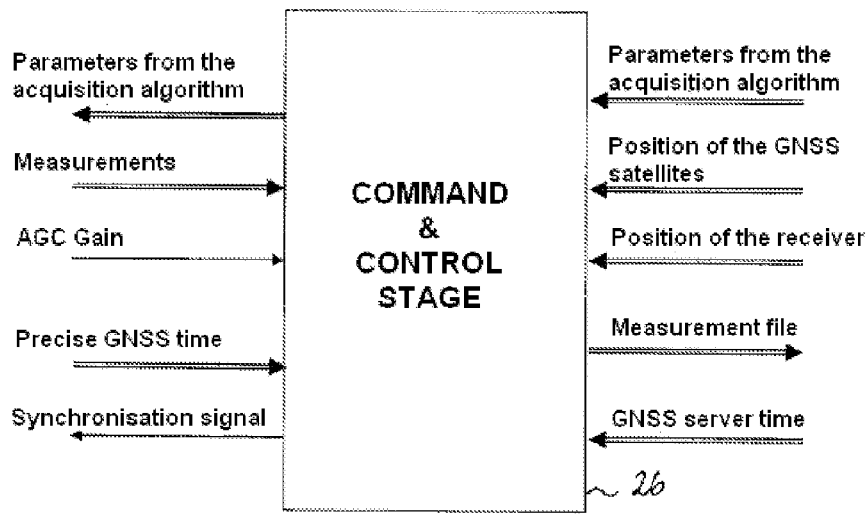
FIG. 5: is a diagram of the interfaces of the command and control stage.

The tasks of the command and control stage 26 (FIG. 5) are notably:
- the data capture of the parameters of the acquisition algorithm,
- the management of the sequencing from the signal treatment stage 22 (including e.g. the selection of the number of non-coherent correlations, the selection of the search strategy for the Doppler, etc.),
- the reception and/or the generation of a synchronisation signal on GNSS time for the internal GNSS clock,
- the generation of a file that contains the results of measurements carried out in the acquisition phase,
- the generation of a file that indicates the gain applied at the level of the AGC as a function of time,
- optionally the data capture of the position of the GNSS satellites (e.g. based on the help data and/or the navigation message), and
- optionally the data capture of an estimation of the position of the receiver (resulting e.g. from a previous acquisition).

Figure 4:
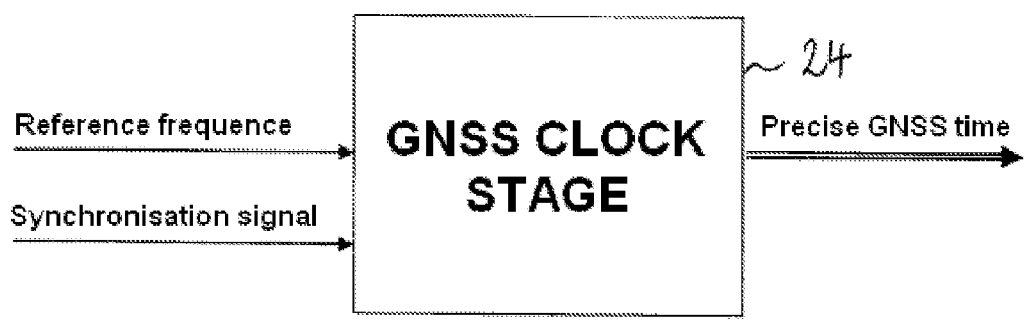
FIG. 4: is a diagram of the interfaces of the GNSS clock stage.
Figure 6:
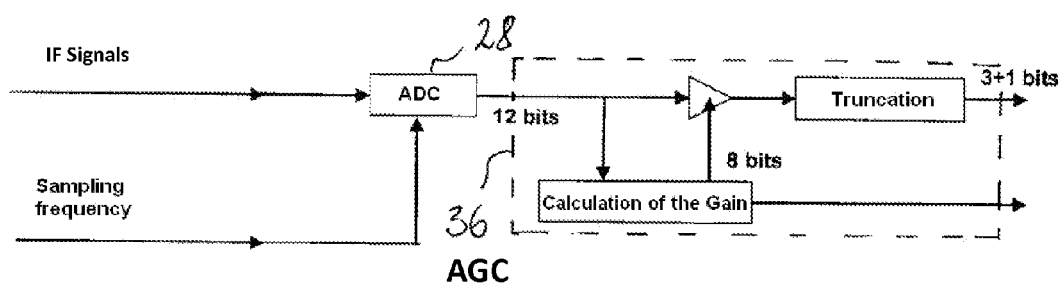
FIG. 6: is a diagram illustrating the digitisation of the signal in intermediate frequency.

As shown in FIGS. 4 and 6, at the input of the signal treatment stage 22, the radionavigation signal to be acquired is contained in an analogical signal at the intermediate frequency (e.g. 140 MHz). The ADC 28 digitises the entering signal on, for example 12 bits, at a predefined sampling frequency $f_e$ (e.g. $f_e$=112 MHz). This digitised signal is then amplified by an automatic gain control (AGC) means 36. If, downstream of the AGC 36, the signal is quantified on 4 bits (3 bits plus 1 sign bit), 8 bits (12 bits−4 bits) are available for creating an AGC loop, with an operational power range of 48 dB (=20 log($2^8$)) with a linear scale. The command from the AGC loop is proportional to the amplitude of the signal coming from the ADC 28 averaged over a period equal to the time constant of the AGC loop.

The frequency converter IF/BB 30 converts the sampled signal coming from the AGC 36 in complex baseband, i.e. on two channels in quadrature of phase, one against the other (the channel I, "in-phase" and the Q channel "in quadrature"). The signal samples coming from AGC 36 are alternately distributed over the two channels I and Q, which are multiplied by the sequences (1, −1, . . . ) for channel I and (−1, 1, . . . ) for channel Q. Consequently, each channel receives samples at the periodicity $f_e/2$, of which each second is inverted. A low-pass filtering is then carried out on each of the two channels. The "in-phase" part (real) is thus obtained in channel I at the sampling frequency $f_e/2$, whereas in channel Q, the part "in quadrature of phase" or more succinctly "in quadrature" (imaginary) is obtained at the sampling frequency $f_e/2$. However, the two channels are shifted in regard to one another by a temporal difference of $1/f_e$. This shift between the channels I and Q is compensated by effecting a low-pass filtering on each channel (with a cut-off frequency of less than or equal to $f_e/4$). In order to apply a Doppler shift, a multiplication by a complex exponential is carried out, provided for example by a numerically controlled oscillator. This multiplication enables the Doppler search area to be centred.

The Case of a Sub-Carrier Modulation (Option 1)

If the radionavigation signal comprises a sub-carrier modulation, e.g. a BOC modulation, then the correlation between the entering signal and a local replica of code without sub-carrier does not show the peak for the delay 0 (i.e. at the moment when the code on the signal coincides with its local replica) due to the presence of the sub-carrier on the entering signal. In order to obtain the correlation peak for the delay 0, then the sub-carrier on the entering signal has to be "eliminated", which in fact means making a correlation between the entering signal and a local replica of code with sub-carrier.

To this end, each of the channels I and Q of the baseband signal is multiplied by the in-phase sub-carrier, affording the channels I-SPI and Q-SPI respectively, as well as in parallel by the quadrature sub-carrier, affording the channels I-SPQ and Q-SPQ respectively. Downstream of the multiplication, each channel is filtered around the principal lobe of the sub-carrier. Optionally, the signals of the channels I-SPI, Q-SPI, I-SPQ and Q-SPQ are re-quantified (for example, on 2 bits). The different components of the signal to be correlated (i.e. the signals on the channels I-SPI, I-SPQ, Q-SPI and Q-SPQ) are preferably interleaved on a unique delay line. This has the advantage that a sole structure of correlators can treat the different signal components. The signal components are then each correlated with the local spreading code replica. The results of the correlation can then be recombined in a discriminator so as to detect the correlation peak.

Figure 7:
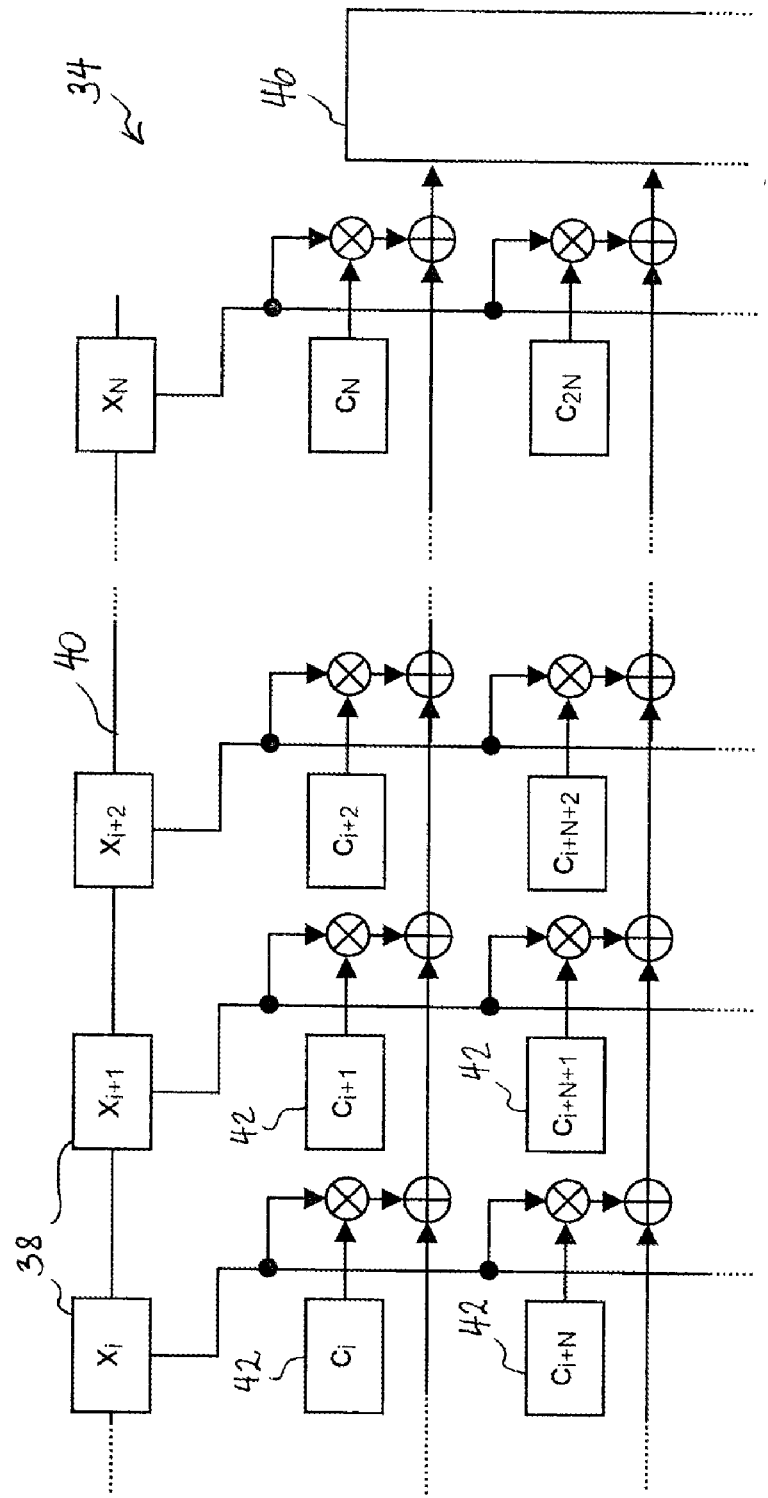
FIG. 7: is a diagram of a part of a correlation module.

In order to explain the correlation method in more detail, let us first be limited to a sole component, designated x(t) of the entering radionavigation signal ((x(t) is therefore selected between I-SPI(t), I-SPQ(t), Q-SPI(t) et Q-SPQ(t) in the case of option 1). FIG. 7 shows the diagram of part of the correlation module 34 as can be used in the context of the present invention. At an instant t, the samples of the signal x, present in the different memory cells 38 of the delay line 40, are $x_1(t)=x(t-T_{coh}+Te')$, $x_2(t)=x(t-T_{coh}+2Te')$, . . . , $x_N(t)=x(t)=x(t-T_{coh}+NTe')$ where $T_{coh}$ is the coherent integration time of the correlation, equal to the duration of the signal sampled on the delay line 40;

Te' is the temporal difference between two consecutive samples 38 of the signal, equal to the inverse of the sampling frequency fe' (which differs from the sampling frequency fe mentioned above and greater than or equal to twice the frequency of chips of the pseudo-random code), and N is the number of samples 38 present on the delay line 40; and $N=T_{coh}/Te'$.

The local spreading code replica is generated by a code generator 32 (shown in FIG. 3) based on GNSS time, supplied with time by an external means. Based on the input GNSS time, the code generator 32 produces a plurality of consecutive sequences of the spreading code, wherein each of these sequences has the length (the number of samples 38 on a channel) of the delay line 40. Remark: $C^1, C^2, \ldots, C^m$ are the different sequences of the spreading code, wherein m is greater or equal to 2 (e.g. equal to 4). Then $C^1=[c_1, c_2, \ldots, c_N]$, $C^2=[c_{N+1}, c_{N+2}, \ldots, c_{2N}], \ldots, C^m=[c_{(m-1)N+1}, c_{(m-1)N+2}, \ldots, c_{mN}]$, where $(c_i)_{i=1,\ldots,N}$ designates the samples of the local spreading code replica sampled at the sampling frequency fe'. The values of the samples of code are 1 or −1.

The sequences of code are stored in the cells 42 one memory per respective code, and each of the sequences of code is correlated with the signal on the delay line.

At each epoch the different sequences of code $C^1, C^2, \ldots, C^m$ are correlated with the signal on the delay line, i.e. integrations are carried out:

$$\text{Corr}^1(t) = \sum_{i=1}^{N} c_i x_i, \quad \text{(Eq. 3)}$$

$$\text{Corr}^2(t) = \sum_{i=1}^{N} c_{i+N} x_i,$$

$$\ldots$$

$$\text{Corr}^m(t) = \sum_{i=1}^{N} c_{i+(m-1)N} x_i.$$

From one integration to the other, the signal x is shifted on the delay line 40 while the local replica from the code, i.e. each of the sequences of code, stays fixed. In other words, the values $c_i$, $c_{mN}$ are not shifted in the cells 42 of the memory of code. In parallel, the code generator stores the next segment of code ($C^{m+1} = [c_{mN+1}, c_{mN+2}, \ldots, c_{(m+1)N}]$) in a reserve memory of code (not shown in the figures). Remark: the different segments of code are correlated with the same part of the signal x. There are thus m parallel correlations (associated with m hypotheses of time at intervals of the correlation time $T_{coh} = N \cdot Te'$) and not a unique correlation, subdivided into a plurality of shorter correlations as in the document WO 2004/034604 A1. However, the person skilled in the art may choose to use the approach of the document WO 2004/034604 A1 in the context of the present invention. In that case, the interval of integration is subdivided into a plurality of equal parts for each of the sequences of code and there are therefore the following integrations:

$$STC_1^1(t) = \sum_{i=1}^{N/n} c_i x_i, \; STC_2^1(t) = \sum_{i=N/n+1}^{2N/n} c_i x_i, \ldots, \quad \text{(Eq. 4)}$$

$$STC_n^1(t) = \sum_{i=N-N/n+1}^{N} c_i x_i$$

$$STC_1^2(t) = \sum_{i=1}^{N/n} c_{i+N} x_i, \; STC_2^2(t) = \sum_{i=N/n+1}^{2N/n} c_{i+N} x_i, \ldots,$$

$$STC_n^2(t) = \sum_{i=N-N/n+1}^{N} c_{i+N} x_i$$

$$\ldots$$

$$STC_1^m(t) = \sum_{i=1}^{N/n} c_{i+(m-1)N} x_i,$$

$$STC_2^m(t) = \sum_{i=N/n+1}^{2N/n} c_{i+(m-1)N} x_i, \ldots,$$

$$STC_n^m(t) = \sum_{i=N-N/n+1}^{N} c_{i+(m-1)N} x_i$$

where n is a divisor of N and $STC_k^l(t)$ is the $k^{th}$ short term correlation between the entering signal and the $l^{th}$ sequence of spreading code. Remark: $\text{Corr}^l(t) = STC_1^l(t) + STC_2^l(t) + \ldots + STC_n^l(t)$, for $l=1, \ldots, m$.

Figure 8:
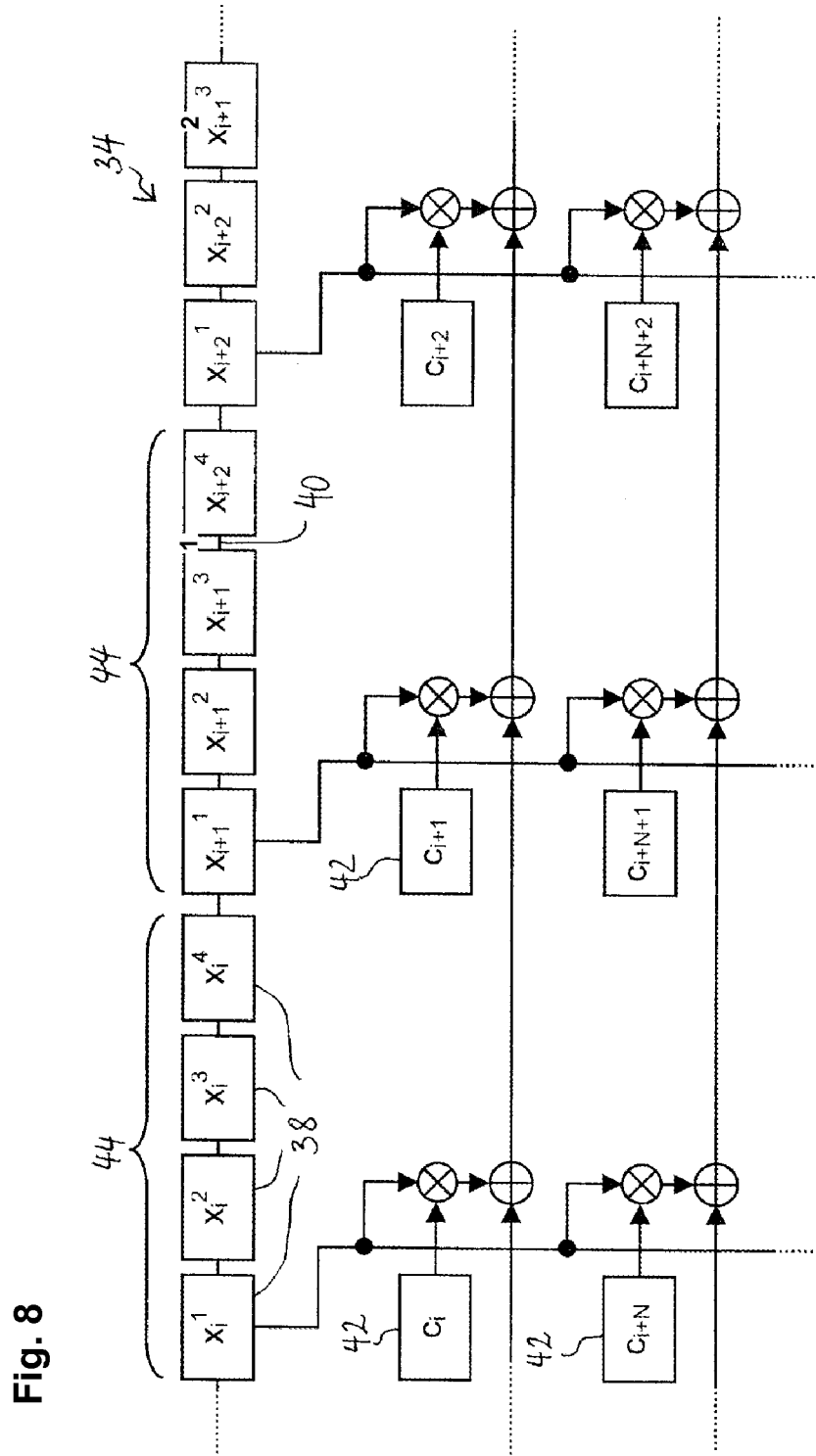
FIG. 8: is a diagram of a part of another correlation module that enables the four different channels to be interleaved on the delay line.

FIG. 8 illustrates the case where the different components of the signal entering on the delay line 40 are interleaved, the N samples of I-SPI(t), I-SPQ(t), Q-SPI(t) and Q-SPQ(t) respectively follow one another in a predefined order. At an instant t the samples that are present on the delay line are, for example [I-SPI$_1$(t)=I-SPI(t−$T_{coh}$+Te'), I-SPQ$_1$(t)=I-SPQ(t−$T_{coh}$+Te'), Q-SPI$_1$(t)=Q-SPI(t−$T_{coh}$+Te'), Q-SPQ$_1$(t)=Q-SPQ(t−$T_{coh}$+Te')], [I-SPI$_2$(t)=I-SPI(t−$T_{coh}$+2Te'), I-SPQ$_2$(t)=I-SPQ(t−$T_{coh}$+2Te'), Q-SPI$_2$(t)=Q-SPI(t−$T_{coh}$+2Te'), Q-SPQ$_2$(t)=Q-SPQ(t−$T_{coh}$+2Te')], …, [I-SPI$_N$(t)=I-SPI(t), I-SPQ$_N$(t)=I-SPQ(t), Q-SPI$_N$(t)=Q-SPI(t), Q-SPQ$_N$(t)=Q-SPQ(t)], where the samples of the different components of the signal associated at the same instant t have been regrouped between brackets for better clarity. The samples of the different components which are associated at the same instant t form a "sample group" 44 on the delay line 40.

For the calculation of the correlations, the expressions indicated above can be used with the substitution x=I-SPI, I-SPQ, Q-SPI or Q-SPQ. At each epoch Te', the components of the signal on the delay line are correlated with the different sequences of code $C^1, C^2, \ldots, C^m$. In the case of 4 signal components, the duration of a clock cycle of the delay line 40 is Te'/4 in order to allow temporal multiplexing. The samples are shifted in the delay line 40 at the rate 4/Te'. In the first quarter of the epoch Te', the correlations are therefore performed between the sequences of code and a first component of the signal (called $x^1$ in FIG. 8), in the second quarter, the correlations are performed between the sequences of code and a second component (called $x^2$) and so on, until the signal on the delay line 40 has been shifted on the delay line 40 for a complete group of samples 44.

Figure 10:
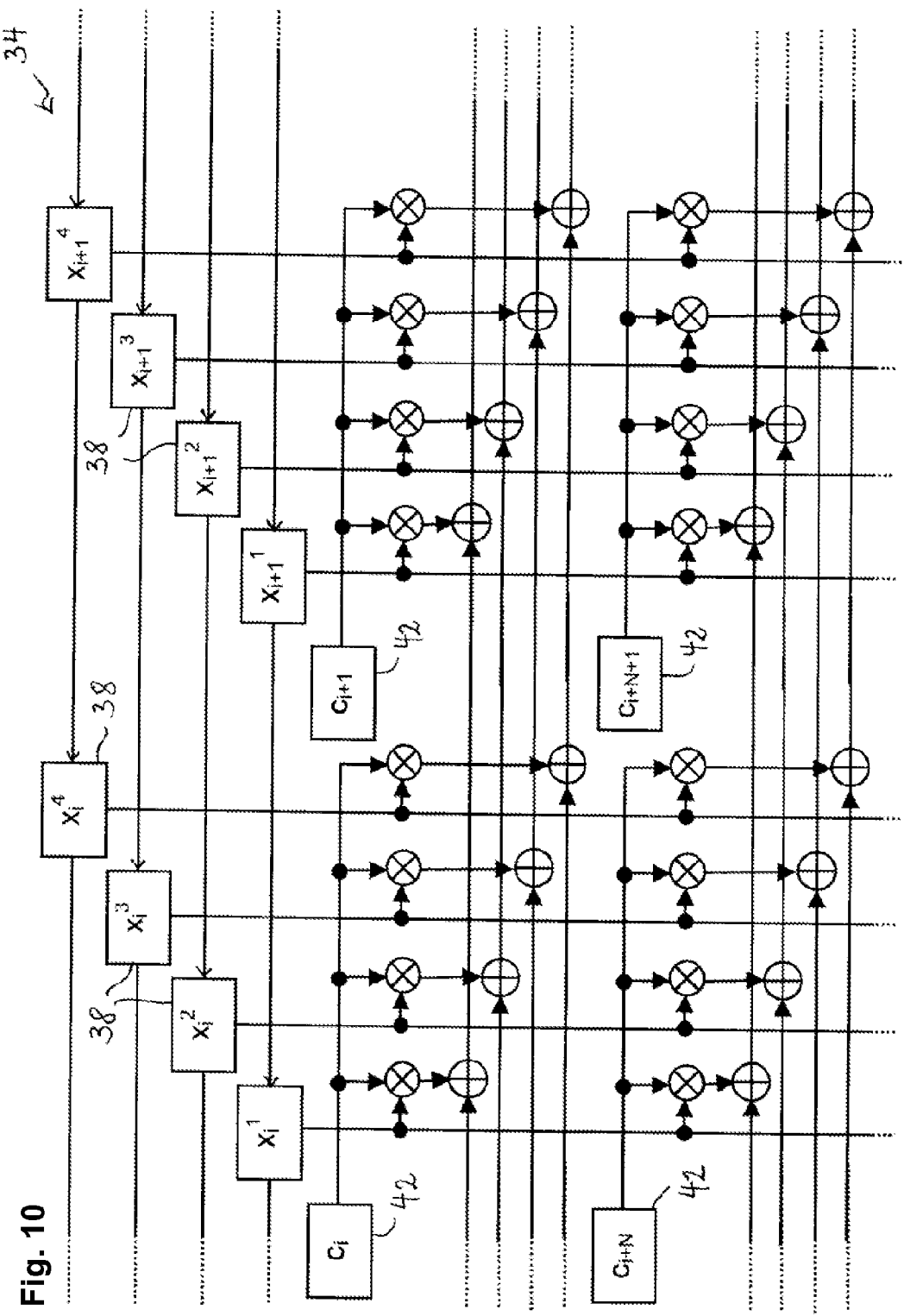
FIG. 10: is a diagram of part of an alternative correlation module to the module of FIG. 8 in which the four channels are treated in parallel.

FIG. 10 shows a correlator architecture that serves to correlate different components of the signal in parallel. The delay line 40 comprises in this case four physical channels $40^1$, $40^2$, $40^3$, $40^4$ of length N, carrying the samples 38 of I-SPI(t), I-SPQ(t), Q-SPI(t) and Q-SPQ(t) respectively. A temporal multiplexing of the different components on a single physical channel as in FIG. 8 is therefore not necessary.

The correlation results ($\text{Corr}^1(t), \ldots, \text{Corr}^m(t)$ or the $STC_k^l(t)$) interleaved or not are conveyed to a non-coherent integration stage 46. In the case where only one Doppler range is treated at a time, the calculation is as follows:

$$S_k(t) = \sum_{j=1}^{M} [\text{Corr}^{(k-j)\bmod m+1}(t-(j-1)T_{coh})]^2, \quad \text{(Eq. 5)}$$

for all $k = 1, \ldots, m$, where M designates the number of non-coherent integrations. Therefore:

$$S_1(t) = (\text{Corr}^1(t))^2 + (\text{Corr}^m(t-T_{coh}))^2 + \ldots + (\text{Corr}^{(1-M)\bmod m+1}(t-(M-1)T_{coh}))^2$$

$$S_2(t) = (\text{Corr}^2(t))^2 + (\text{Corr}^1(t-T_{coh}))^2 + \ldots + (\text{Corr}^{(2-M)\bmod m+1}(t-(M-1)T_{coh}))^2$$

$$\ldots$$

$$S_m(t) = (\text{Corr}^m(t))^2 + (\text{Corr}^{m-1}(t-T_{coh}))^2 + \ldots + (\text{Corr}^{(m-M)\bmod m+1}(t-(M-1)T_{coh}))^2.$$

Figure 9:
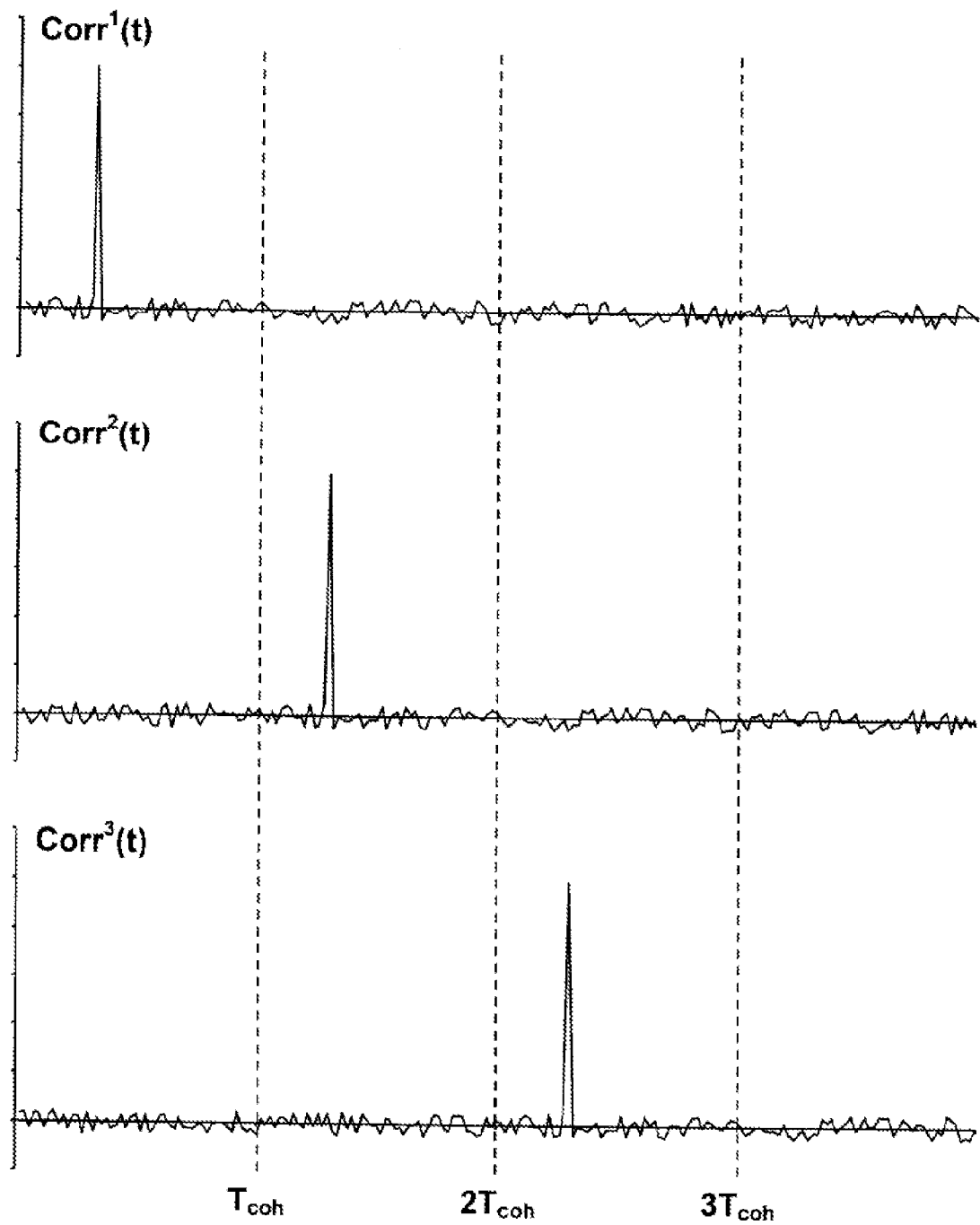
FIG. 9: is a depiction of the correlation functions between the signal on the delay line and the successive code sequences.

Equation 5 is explained by the fact that, if there is a correlation peak between the signal and the first sequence of code at an instant t, then there is also a correlation peak between the signal and the second sequence of code at the instant t+$T_{coh}$. FIG. 9 depicts this situation for $\text{Corr}^1$, $\text{Corr}^2$ and $\text{Corr}^3$ as a function of time. This is taken into account in equation 5 by integrating in a non-coherent manner the M last periods of coherent integration (of duration $T_{coh}$ corresponding to the length of the delay line).

In the case of a plurality of Doppler ranges to be treated in parallel, the non-coherent integration stage 46 comprises a fast Fourier transform stage that receives as input the vectors $[STC_1^1, STC_2^1, STC_3^1, \ldots, STC_n^1]$, $[STC_1^2, STC_2^2, STC_3^2, \ldots, STC_n^2], \ldots,$ and $[STC_1^m, STC_2^m, STC_3^m, \ldots, STC_n^m]$. The correlation results (the STC) can be requantified prior to the fast Fourier transform (FFT). In order to avoid losses, the FFT is preferably carried out using a "zero padding" technique. On exiting the FFT stage, the transformed vectors can be requantified. The non-coherent integration per se is then carried out analogously to equation 5 for each Doppler range.

The recomposition of the energy is made by non-coherently summing the different components of the signal (I-SPI, I-SPQ, Q-SPI and Q-SPQ).

A compensation for the Doppler code delay can be applied by modifying the group propagation time of a numerical filter to be provided downstream of the correlators and, when necessary downstream of the FFT stage.

The detection is carried out by comparing the recomposed energy with a detection threshold: when the energy exceeds the detection threshold, there is a significant correlation between the received radionavigation signal and its local replica, and the radionavigation signal is regarded as acquired. The detection threshold is preferably adjusted to the process as a function of the existing noise level and the desired performance. A minimum signal to noise ratio (SN-Rmin) can be set starting from the different predefined performance indicators such as the detection probability, the probability of false alarms, the strength of interfering intra-system signals, the inter-correlations between intra-system pseudo-random codes, the coherent integration time ($T_{coh}$) and the number of non-coherent integrations (M). The noise level is detected in the process, e.g. by calculating an average of a plurality of energy values at a distance away from the global maximum. The detection threshold is obtained by multiplying the minimum signal to noise ratio with the existing noise level.

While the receiver is making the correlation calculations, the code memories are successively updated. At the end of the N epochs, the code memory containing the "oldest" section of code, in this case $C^1$, is emptied and the correlation is resumed for the m segments of code $C^2, C^3, \ldots, C^{m+1}$. In parallel, the code generator stores the following segment of code ($C^{m+2} = [c_{(m+1)N+1}, c_{(m+1)N+2}, \ldots, c_{(m+2)N}]$) in the new reserve memory, i.e. the previously emptied memory. In this way, m consecutive segments of code are correlated in parallel with the component of the signal on the delay line. The temporal search range becomes considerably larger because of the parallel treatment. The result is that more tolerance can be accepted in regard to the precision of the time hypothesis.

If a correlation peak is not detected in the temporal search range, then this means that the time hypothesis that formed the basis, on which the code sequences had been calculated, was too imprecise. In that case, the code generator reinitialises the different code memories on the basis of a new time hypothesis.

The Case of a Sub-Carrier Modulation (Option 2)

Instead of "eliminating" the sub-carrier by sub-dividing the channels I and Q of the entering signal in the channels I-SPI, I-SPQ, Q-SPI and Q-SPQ, an alternative is to correlate the channels I and Q with the spreading code sequences modulated by the sub-carrier.

The components I and Q are preferably interleaved on a single delay line. Instead of the four samples per group of samples as in the previous case, there are only two here. The signal components are then each correlated with the local replica of the spreading waveform comprising both the code and the sub-carrier.

As in the case of option 1, the local spreading code replica is generated by a code generator 32 based on GNSS time, supplied with time by an external means. Based on the input GNSS time, the code generator produces a plurality of consecutive sequences of the spreading code, wherein each of these sequences has the length (the number of samples) of the delay line and carries a modulation of the sub-carrier. In the case of a binary sub-carrier, the values of the samples of code remain 1 or −1. However, in the case of a multi-level sub-carrier, the samples of code can assume other values.

The sequences of code are stored in a respective memory of code, and each of the sequences of code is correlated with the components I and Q of the signal on the delay line. The equations 3 and 4 remain valid with the substitutions $x(t)=I(t)$ or $x(t)=Q(t)$ and where $[c_1, c_2, \ldots, c_{mN}]$ designates the samples of the local spreading code replica modulated by the sub-carrier.

The Case of a Modulation without Sub-Carrier

Let us assume here that the modulation does not contain a sub-carrier, i.e. the entering signal contains the carrier that is modulated by the spreading code, e.g. by means of a BPSK (binary phase shift keying) modulation, QPSK modulation (quadrature phase shift keying), etc.

In the case of modulations without sub-carrier, the channels I and Q are correlated with the spreading code sequences.

As in the preceding cases, the components I and Q are preferably interleaved on a single delay line. The signal components are then each correlated with the local spreading code replica.

The local spreading code replica is generated by a code generator based on GNSS time, supplied with time by an external means. Based on the input GNSS time, the code generator produces a plurality of consecutive spreading code sequences, wherein each of these sequences has the length (the number of samples) of the delay line.

The sequences of code are stored in a respective memory of code, and each of the sequences of code is correlated with the components I and Q of the signal on the delay line. The equations 3 and 4 remain valid with the substitutions $x(t)=I(t)$ or $x(t)=Q(t)$ and where $[c_1, c_2, \ldots, c_{mN}]$ designates the samples of the local spreading code replica.

Remark: even in a case of sub-carrier modulation, one could consider correlating the channels I and Q of the baseband signal with the local spreading code replica without eliminating the sub-carrier, e.g. to implement an acquisition and tracking scheme such as described in the document US 2008/0159198.

The invention claimed is:

1. A method for acquiring a radionavigation signal carrying a spreading code with a period that is at least 10 times longer than a correlation time, comprising:
    obtaining a baseband radionavigation signal based on converting the radionavigation signal to an intermediate frequency radionavigation signal and sampling and converting the intermediate frequency radionavigation signal to the baseband radionavigation signal on a delay line, and
    correlating the baseband radionavigation signal with a local spreading code replica so as to identify a time delay between the spreading code of the baseband radionavigation signal and the local spreading code replica in a temporal alignment search space;
    wherein, in order to correlate the baseband radionavigation signal with the local spreading code replica, m spreading code sequences are generated where m is greater than 1, each of said m spreading code sequences being of a same duration, equal to a duration of the baseband radionavigation signal, and said m spreading code sequences are associated with consecutive m time hypotheses spaced by the correlation time in the temporal alignment search space, each of said m spreading code sequences is correlated with the baseband radionavigation signal in a respective correlation operation among m correlation operations, said m correlation operations being executed in parallel for each of said m spreading code sequences associated with the m time hypotheses spaced by the correlation time.

2. The method according to claim 1 wherein the sampling the radionavigation signal in baseband on the delay line comprises splitting of the radionavigation signal into an in-phase component and a quadrature phase component on the respective channels of the delay line, and wherein each of said m spreading code sequences is correlated with the in-phase component and the quadrature phase component.

3. The method according to claim 2 wherein the channels of the in-phase and quadrature phase components are interleaved on the delay line, and wherein each of said m spreading code sequences is correlated alternately with the in-phase component and the quadrature phase component.

4. The method according to claim 1 wherein the baseband radionavigation signal is modulated by a sub-carrier.

5. The method according to claim 4 wherein the sequences of generated codes are modulated by a local replica of the sub-carrier.

6. The method according to claim 4 wherein the sampling the radionavigation signal on the delay line comprises splitting of the radionavigation signal into an in-phase component multiplied by a local replica of the in-phase sub-carrier, an in-phase component multiplied by a local replica of the quadrature phase sub-carrier, a quadrature phase component of the signal multiplied by a local replica of the in-phase sub-carrier and a quadrature phase component of the signal multiplied by a local replica of the quadrature phase sub-carrier, the components being sampled on respective channels of the delay line, and wherein each of said m spreading code sequences is correlated with each of the components.

7. The method according to claim 6 wherein the component channels are interleaved on the delay line, and wherein each of said m spreading code sequences is correlated alternately with the different components.

8. The method according to claim 1 wherein the correlation of the baseband radionavigation signal with the local spreading code replica is carried out with a matched filter.

9. The method according to claim 1 wherein said m spreading code sequences are generated on the basis of a global navigation satellite system (GNSS) indication of time provided by an external provider.

10. A receiver for acquiring a radionavigation signal carrying a spreading code with a period that is at least 10 times longer than the correlation time, comprising:

processing means designed for obtaining a baseband radionavigation signal based on converting the radionavigation signal to an intermediate frequency radionavigation signal and sampling and converting the intermediate frequency radionavigation signal to the baseband radionavigation signal on a delay line, and correlation means for correlating the baseband radionavigation signal with a local spreading code replica so as to identify a temporal difference between the spreading code of the baseband radionavigation signal and the local spreading code replica in a temporal alignment search space;

wherein the correlation means are configured for generating m spreading code sequences, wherein m is greater than 1 and the spreading code sequences are of a same duration, equal to a duration of the baseband radionavigation signal, and associated with consecutive m time hypotheses spaced by the correlation time in the temporal alignment search space, and for correlating each of said m spreading code sequences with the baseband radionavigation signal in a respective correlation operation among m correlation operations, wherein the correlation means execute the correlation operations in parallel for each of the spreading code sequences associated with the m time hypotheses spaced by the correlation time.

11. The receiver according to claim 10, configured for implementing a method for acquiring a radionavigation signal carrying a spreading code with a period that is at least 10 times longer than the correlation time, comprising:

obtaining a baseband radionavigation signal based on converting the radionavigation signal to an intermediate frequency radionavigation signal and sampling and converting the intermediate frequency radionavigation signal to the baseband radionavigation signal on the delay line, and correlating the baseband radionavigation signal with a local spreading code replica so as to identify a time delay between the spreading code of the radionavigation signal and the local spreading code replica in a temporal alignment search space;

wherein, in order to correlate the baseband radionavigation signal with the local spreading code replica, m spreading code sequences are generated, m being greater than 1 and said m spreading code sequences being of the same duration, equal to a duration of the baseband radionavigation signal, and associated with consecutive m time hypotheses spaced by the correlation time in the temporal alignment search space, each of said m spreading code sequences is correlated with the baseband radionavigation signal in a respective correlation operation, said correlation operations being executed in parallel for each of the spreading code sequences, wherein the sampling the radionavigation signal on the delay line comprises splitting of the radionavigation signal into an in-phase component and a quadrature phase component on the respective channels of the delay line, and wherein each of said m spreading code sequences is correlated with the in-phase component and the quadrature phase component.

12. A computer program product for acquiring a radionavigation signal carrying a spreading code with a period that is at least 10 times longer than the correlation time, the computer program product comprising a non-transitory computer-readable medium to store instructions and execute the instructions to perform a method, the method comprising:

obtaining a baseband radionavigation signal based on converting the radionavigation signal to an intermediate frequency radionavigation signal and sampling and converting the intermediate frequency radionavigation signal on a delay line, and correlating the baseband radionavigation signal with a local spreading code replica so as to identify a time delay between the spreading code of the baseband radionavigation signal and the local spreading code replica in a temporal alignment search space;

wherein, in order to correlate the baseband radionavigation signal with the local spreading code replica, m spreading code sequences are generated where m is greater than 1, each of said m spreading code sequences being of a same duration, equal to a duration of the baseband radionavigation signal, and said m spreading code sequences are associated with consecutive m time hypotheses spaced by the correlation time in the temporal alignment search space, each of said m spreading code sequences is correlated with the baseband radionavigation signal in a respective correlation operation among m correlation operations, said m correlation operations being executed in parallel for each of said m spreading code sequences associated with the m time hypotheses spaced by the correlation time, wherein the sampling the radionavigation signal on the delay line comprises splitting of the radionavigation signal into an in-phase component and a quadrature phase component on the respective channels of the delay line, and wherein each of said m spreading code sequences is correlated with the in-phase component and the quadrature phase component.

\* \* \* \* \*